(12) United States Patent
Ribarich et al.

(10) Patent No.: US 9,577,530 B1
(45) Date of Patent: Feb. 21, 2017

(54) BOOST CONVERTER WITH ZERO VOLTAGE SWITCHING

(71) Applicant: NAVITAS SEMICONDUCTOR, INC., El Segundo, CA (US)

(72) Inventors: Tom Ribarich, Laguna Beach, CA (US); Jason Zhang, Monterey Park, CA (US)

(73) Assignee: Navitas Semiconductor, Inc., El Segundo, CA (US)

( * ) Notice: Subject to any disclaimer, the term of this patent is extended or adjusted under 35 U.S.C. 154(b) by 0 days.

(21) Appl. No.: 15/356,425

(22) Filed: Nov. 18, 2016

Related U.S. Application Data

(60) Provisional application No. 62/258,167, filed on Nov. 20, 2015.

(51) Int. Cl.
*H02M 3/158* (2006.01)
*H02M 1/42* (2007.01)
*H02M 1/44* (2007.01)

(52) U.S. Cl.
CPC ........... *H02M 3/158* (2013.01); *H02M 1/42* (2013.01); *H02M 1/44* (2013.01)

(58) Field of Classification Search
CPC ............ H02M 1/32; H02M 1/34; H02M 1/38; H02M 1/42; H02M 1/4225; H02M 1/4258; H02M 1/44; H02M 3/142; H02M 3/158
See application file for complete search history.

(56) References Cited

U.S. PATENT DOCUMENTS

| | | | | |
|---|---|---|---|---|
| 5,313,383 A | * | 5/1994 | Ikeuchi | H02M 3/158 323/222 |
| 6,259,235 B1 | * | 7/2001 | Fraidlin | H02M 3/158 323/222 |
| 8,129,960 B2 | * | 3/2012 | Ito | H02M 1/34 323/225 |
| 2012/0235649 A1 | * | 9/2012 | Uno | H02M 1/4225 323/210 |

* cited by examiner

*Primary Examiner* — Matthew Nguyen
(74) *Attorney, Agent, or Firm* — Kilpatrick Townsend & Stockton

(57) ABSTRACT

A power converter circuit is disclosed. The circuit includes a capacitor connected across first and second output terminals, an inductor configured to receive current from a power source, and a main switch configured to selectively conduct current from the inductor to a ground. The circuit also includes a diode configured to conduct current from the inductor to the capacitor, and a second switch connected in parallel with the diode, where the second switch is configured to selectively conduct current from the capacitor to the inductor.

20 Claims, 6 Drawing Sheets

BOOST CONVERTER WITH ZERO VOLTAGE SWITCHING

CROSS-REFERENCES TO RELATED APPLICATIONS

This application claims priority to Provisional Application No. 62/258,167, filed Nov. 20, 2015, titled "BOOST CONVERTER WITH ZERO VOLTAGE SWITCHING", which is hereby incorporated by reference in its entirety.

FIELD

The present invention relates generally to soft switched power converters, and in particular to zero voltage soft switching (ZVS) in Boost converters.

BACKGROUND

Switched mode power converters are ubiquitous and are often used to convert one form of power to another. For example a Boost converter may be employed in an electronic system to convert a high voltage alternating current (AC) bus (e.g., 220 volts AC) to a higher voltage direct current (DC) bus (e.g., 400 volts DC) that may power a component such as a desktop computer or flat panel TV. Switched mode power converters have three basic figures of merit: cost, size and efficiency. To be accepted in large volume applications, power converters must meet minimum requirements for all three specifications.

Power loss in a switch, or field-effect transistor (FET) employed in switched mode power converters comes from two sources. FETs have a resistive element, that dissipates power as current is conducted through the device. The resistive parameter is typically called "on-resistance", or RDS(ON) (i.e., resistance from drain to source when the FET is biased on). These conduction losses are inversely proportional to the size of the FET (i.e., the larger the FET, the lower its RDS(ON) and, therefore, the lower its conduction loss). The other source of power loss is through switching losses. Every time a solid-state switch is turned on or off there is energy loss, as described in more detail below.

Increased switching frequency has been a significant factor in the improvement in the cost and size of switched mode power converters. Increased switching frequency typically reduces the size of peripheral components and provides improved transient response for demanding applications. However, as discussed above, increased switching frequency results in increased power loss and decreased efficiency for the power converter.

Two major factors contribute to power loss from switching the transistors: turn-on loss, or the energy used to discharge drain-source capacitance (also commonly referred to as output capacitance or Coss); and crossover loss, or the energy lost during turn-on and turn-off transitions (i.e., the current and voltage overlap area as the switch transitions between states).

With regard to output capacitance, or Coss, as the FET switches on and off with a voltage potential across it, its intrinsic parasitic capacitance stores and then dissipates energy during each switching transition. Essentially there is an embedded capacitor within the switch that must be charged and discharged with each switching cycle. The output capacitance losses are proportional to the voltage across the switch, the switching frequency and the value of the parasitic capacitance. As the physical size of the FET increases, its output capacitance also increases. Therefore, as discussed above, increasing FET size may reduce RDS (ON), however it also increases output capacitance and thus increases switching loss.

Many types of control modes for Boost converter circuits exist that include continuous conduction mode (CCM), discontinuous conduction mode (DCM) and critical-conduction mode (CrCM) also known as boundary mode (BM). For CrCM, full ZVS is already achieved at low AC line voltage input levels (e.g., 120 VAC). At high AC line voltage input levels (e.g., 220 VAC) non-ZVS (or partial ZVS) occurs resulting in increased switching losses. Many ZVS schemes have been proposed for reducing the voltage potential across the switch to near 0 prior to operating the switch. These ZVS schemes have not been widely adopted as the increased switching losses are still acceptable for overall system efficiency requirements at operating frequencies lower than 200 kHz. At higher switching frequencies (e.g., >500 kHz) the switching losses due to partial-ZVS become significant and therefore limit the maximum allowable operating frequency of the system. Limitation of the maximum switching frequency then prevents further reduction of the boost inductor size and prevents further increase in the overall power density of the power converter.

Silicon devices have a relatively large output capacitance (Coss) (e.g., 200 picofarads) which takes a relatively long amount of time to charge. In high frequency applications, the time required to charge the output capacitance may limit the switching frequency of the converter. Further, silicon devices switch relatively slowly, (e.g., on the order of 20 nanoseconds) which also limits the switching frequency. Yet further, silicon devices are vertical structures typically fabricated such that the substrate is a drain terminal. Thus they do not lend themselves easily to monolithic integration with other devices as the other devices would be fabricated on the drain connection. This significantly restricts packaging and integration options to save packaging cost and size. Thus, in a two switch silicon-based power converter each switch is typically a separate device. The switch driver and controller circuits are also typically separate devices further increasing costs and increasing the driver delay due to packaging parasitics. Moreover, especially for high voltage applications (i.e., greater than 100 volts), silicon devices have poor performance characteristics and require large, slow, expensive driver circuits to operate. These and other factors have limited the adoption of ZVS architectures for silicon-based high frequency, high voltage applications.

SUMMARY

A power converter circuit is disclosed. The circuit includes a capacitor connected across first and second output terminals, an inductor configured to receive current from a power source, and a main switch configured to selectively conduct current from the inductor to a ground. The circuit also includes a diode configured to conduct current from the inductor to the capacitor, and a second switch connected in parallel with the diode, where the second switch is configured to selectively conduct current from the capacitor to the inductor.

Another inventive aspect is a method of operating a power converter circuit including a capacitor connected across first and second output terminals, an inductor configured to receive current from a power source, a main switch, a diode, and a second switch connected in parallel with the diode. The method includes conducting current from a power source to the inductor, selectively conducting current from the inductor to a ground, and with the diode, conducting current from the inductor to the capacitor. The method also includes, with the second switch, selectively conducting current from the capacitor to the inductor.

DETAILED DESCRIPTION

Certain embodiments of the present invention relate to power conversion circuits. While the present invention can be useful for a wide variety of power conversion circuits, some embodiments of the invention are particularly useful for AC to DC and DC to DC converters that use ZVS bidirectional switches, as described in more detail below.

Many electronic devices such as smart-phones, media players, and tablet computers require low-voltage DC power to operate. Some electronic devices may be configured to connect to an AC mains to receive high-voltage AC power. For higher power devices such as desktop computers for flat panel TVs, a high power factor is required at the AC mains input. High power factor is achieved by shaping the AC mains input current of the device to match the sinusoidal shape and phase of the AC mains input voltage. Circuits used to generate a high power factor are known as power factor correction circuits. To make the AC power useful for the electronic device, it is typically rectified and then boosted up to a higher intermediate DC bus voltage while maintaining a sinusoidal-shaped input current. This intermediate higher DC bus voltage may then be converted to a lower DC voltage by a DC to DC power conversion circuit. In some embodiments a ZVS high-efficiency AC to DC power conversion circuit that employs bidirectional switches and a novel control scheme may be used.

Figure 1:
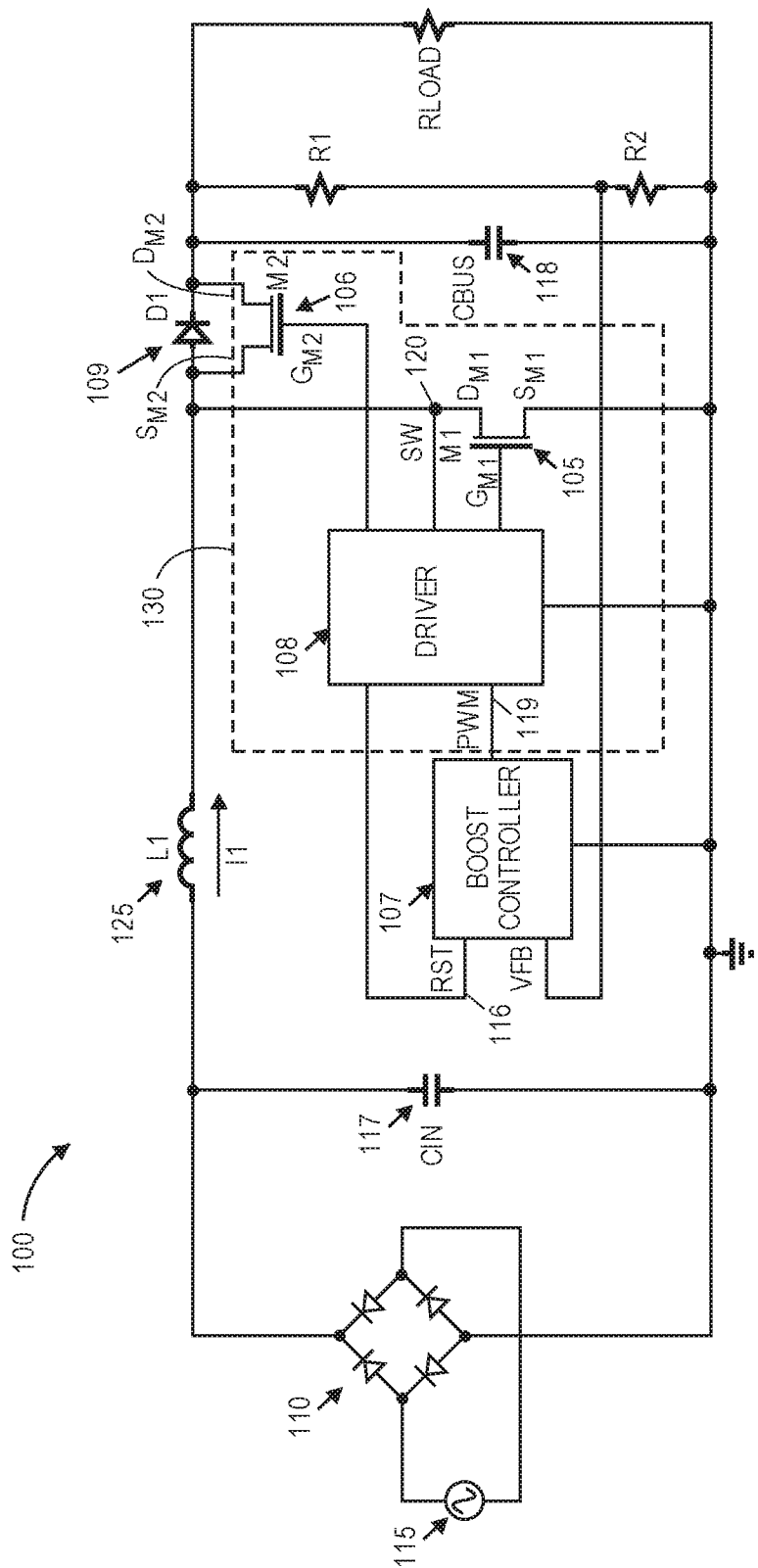
FIG. 1 is a circuit schematic illustration of a Boost converter using two switches according to an embodiment of the invention.

FIG. 1 is a circuit schematic illustration of a Boost converter circuit 100 using two switches 105 and 106 according to an embodiment of the invention. In some embodiments, a main switch (M1) 105 and a second switch (M2) 106 may be used as bidirectional switches in the circuit. In further embodiments, a control scheme may be collectively used by circuit controller 107 and half-bridge driver 108 to control main switch 105 and second switch 106 such that second switch 106 may be turned on slightly before the main switch 105, creating enough negative current in inductor 125 to cause zero voltage soft-switching (ZVS) of main switch 105, as discussed in more detail below.

In ZVS operation, the bidirectional semiconductor switch may be turned on or off only when the voltage applied across the switch is at or near zero, for example, when the output capacitance, or Coss, is at or near zero charge. Switching losses resulting, for example, from turning a switch off while it is conducting current or turning a switch on when it has a voltage potential across it, may be a significant contributor to power loss in the system. The use of ZVS may result in reduced switching losses, increased frequency of operation and in some embodiments, reduced electromagnetic interference (EMI) generation.

Continuing to refer to circuit 100 in FIG. 1, controller 107 may, for example, be a standard boost controller circuit. For example, controller 107 may be configured to generate a pulse at its PWM output in response to either of: a) the controller 107 receiving power and turning on, and b) the controller 107 receiving an input signal at its RST input. The duration of the pulse is determined at least in part by an analog voltage at the VFB input to controller 107.

Controller 107 and driver 108 have logic and control functionality such that they cooperatively control the operation of main switch 105 and second switch 106. As indicated in FIG. 1, controller 107 sends one or more control signals PWM to driver 108. In response to the PWM signals, driver 108 sends one or more gate drive signals to main switch 105 and second switch 106. In response to the one or more gate drive signals, main switch 105 and second switch 106 transition between an on state and an off state. Circuit 100 may receive power from power source 115, which may, for example, be an AC mains power source. In some embodiments main switch 105 and second switch 106 may be bidirectional N-channel gallium-nitride (GaN) high-electron mobility transistors (HEMT), however in other embodiments other switches may be used, as discussed in more detail below.

Figure 2:
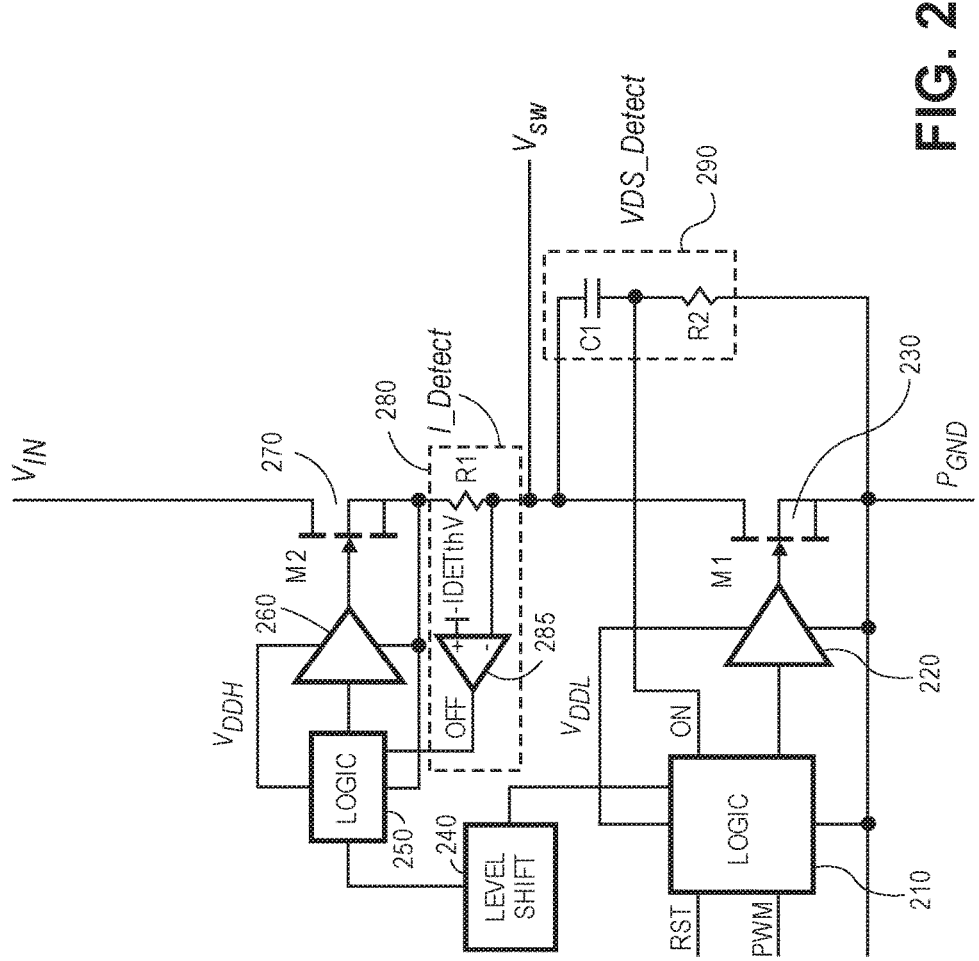
FIG. 2 is a circuit schematic illustration of an embodiment of a half-bridge circuit which may be used in the circuit illustrated in FIG. 1.

FIG. 2 is a circuit schematic illustration of an embodiment of a half-bridge driver circuit 200 which may be used as half-bridge driver circuit 130 in converter circuit 100 illustrated in FIG. 1. Half-bridge circuit 200 includes low side logic 210, low side driver 220, low side power switch 230, low side switch Vds detector 290, level shift circuit 240, high side logic 250, high side driver 260, high side power switch 270, and high side switch current detector 280.

Low side logic 210 receives PWM signals at a PWM input. For example, the PWM signals may be similar or identical to the PWM signals generated by controller 107 discussed above with reference to FIG. 1. In response to the PWM signals, low side logic 210 generates and transmits a control signal to low side driver 220. In response to the control signal from low side logic 210, low side driver 220 generates and transmits a gate signal to low side power switch 230. Low side power switch 230 turns on or becomes conductive or turns off or becomes nonconductive according to and in response to the gate signal received from low side driver 220.

Low side switch Vds detector 290 generates an ON signal in response to the voltage difference between the drain and source of power switch 230 transitioning to 0 volts. The negative transition of the Vds of power switch 230 is capacitively coupled to the ON signal, causing the ON signal to go below a logic threshold below the $P_{GND}$ reference voltage. The ON signal is transmitted to low side logic 210. In response to the ON signal going below the logic threshold, low side logic 210, generates an RST signal.

In some embodiments, it may be desirable for the logic threshold for the ON signal in low side logic 210 to be above the $P_{GND}$ reference voltage. This may be accomplished, for example, by connecting resistor R2 to the power supply $V_{DDL}$ instead of to the $P_{GND}$ reference voltage. In such embodiments, the negative transition of the Vds of power switch 230 causes the ON signal to go below the voltage of the power supply $V_{DDL}$. Accordingly, a logic threshold between the voltage of the power supply $V_{DDL}$ and the $P_{GND}$ reference voltage may be used in low side logic 210.

In some embodiments, it may be desirable for the negative transition of the ON signal to not result in the ON signal going below or not going significantly below the $P_{GND}$ reference voltage. This may be accomplished, for example, by connecting a second capacitor (not shown) between the ON signal and the $P_{GND}$ reference. Because the negative transition of the Vds of power switch 230 is known, capacitor C1 and the second capacitor may be sized so that the known negative transition of the Vds of power switch 230 results in a negative transition in the ON signal which goes below the logic threshold but does not go below the $P_{GND}$ reference voltage. Additionally or alternatively, the ON signal may be prevented from going significantly below the $P_{GND}$ reference voltage by connecting a clamping diode (not shown) between the ON signal and the $P_{GND}$ reference, such that the anode of the clamping diode is connected to the $P_{GND}$ reference voltage and the cathode of the clamping diode is connected to the ON signal.

In response to the PWM signal, low side logic 210 also generates a high side control signal for level shift circuit 240. In response to the high side control signal from low side logic 210, level shift circuit 240 generates an input signal for high side logic 250.

High side logic 250 receives the input signal from level shift circuit 240 at an input. In response to the input signal, high side logic 250 generates and transmits a first control signal to high side driver 260. In response to the first control signal from high side logic 250, high side driver 260 generates and transmits a first gate signal to high side power switch 270. High side power switch 270 turns on or becomes conductive in response to the first gate signal received from high side driver 260, such that current can flow between the drain and source of high side power switch 270.

High side switch Ids detector 280 generates an OFF signal in response to the current conducted from the drain of power switch 270 to the source of power switch 270 being greater than a threshold. The OFF signal is transmitted to high side logic 250. In response to the OFF signal, high side logic 250 generates and transmits a second control signal to high side driver 260. In response to the second control signal from high side logic 250, high side driver 260 generates and transmits a second gate signal to high side power switch 270. High side power switch 270 turns off or becomes substantially non-conductive in response to the second gate signal received from high side driver 260, such that current substantially cannot flow between the drain and source of high side power switch 270.

High side logic 250 and high sided driver 260 have power supply reference connections to the source of high side power switch 270 and power supply $V_{DDH}$. Power supply $V_{DDH}$ may be a floating power supply, which is referenced to the voltage of the switch node Vsw. Power supply $V_{DDH}$ may be generated, for example, with a bootstrap circuit. Power supply $V_{DDH}$ may be generated, for example, with another circuit configured to generate a floating power supply referenced to a changing voltage.

FIGS. 3A-3H illustrate a series of timing diagrams of certain currents and voltages of the circuit 100 of FIG. 1 during operation. In this embodiment, circuit 100 has the half-bridge driver circuit 200 as the half-bridge driver circuit 130.

FIGS. 3A-3H illustrate V_RST, V_PWM, VG:M1, VDS:M1, I_L1, VG:M2, V_OFF, and V_ON. V_RST is the voltage of a reset pulse signal generated by driver 108 which causes controller 107 to generate V_PWM. V_PWM is the voltage of a PWM pulse generated by controller 107. VG:M1 is the gate voltage of main switch 105. VDS:M1 is the difference between the drain and source voltages of main switch 105. I_L1 is the current flowing through inductor L1 toward RLOAD. VG:M2 is the gate voltage of the second switch 106. V_OFF is the voltage of the OFF signal generated by high side switch current detector 280. V_ON is the voltage of the ON signal generated by low side switch Vds detector 290.

Controller 107 receives a reset pulse in V_RST (shown in FIG. 3A) from half-bridge driver 108.

Controller 107 generates a PWM pulse in V_PWM (shown in FIG. 3B) in response to receiving the reset pulse at its RST input. The duration of the PWM pulse is determined at least in part by an analog voltage at the VFB input to controller 107. For example, a PWM pulse of a longer duration may cause the converter to generate a higher voltage output across RLOAD, and therefore, at the VFB input to controller 107. Similarly, a PWM pulse of a shorter duration may cause the converter to generate a lower voltage output across RLOAD, and therefore, at the VFB input to control 107.

In addition, a lower voltage at the VFB input to controller 107 may cause a PWM pulse of a longer duration. Similarly, a higher voltage at the VFB input to controller 107 may cause a PWM pulse of a shorter duration.

Accordingly, the analog voltage at the VFB input to controller 170 may be used as a feedback signal so that the circuit 100 generates the desired output voltage. In such an arrangement, if the analog voltage at the VFB input to controller 170 is greater than a threshold, controller 107 is configured to generate PWM pulses of a shorter duration and if the analog voltage at the VFB input to controller 170 is less than the threshold, controller 170 is configured to generate PWM pulses of a greater duration. In the embodiment of FIG. 1, the analog voltage at the VFB input to controller 170 is generated by a resistor divider formed by R1 and R2, where the analog voltage at the VFB input to controller 170 is equal to R2/(R1+R2) times the voltage across RLOAD.

Figure 3A:
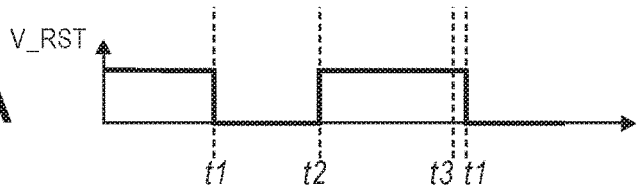
FIG. 3A to 3H is a series of timing diagram illustrations of various electrical parameters of the circuit of plot of FIG. 1.
Figure 3B:
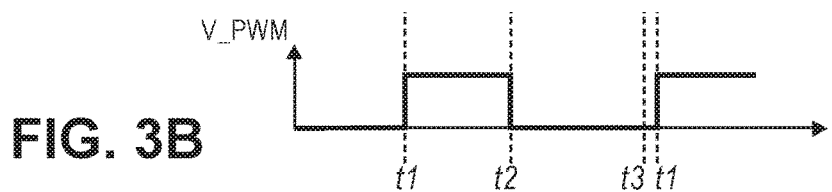
Figure 3C:
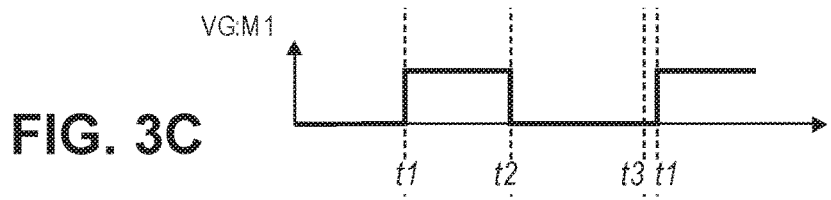

Referring to FIGS. 3A and 3B, the falling edge of V_RST (shown in FIG. 3A) at the first time t1 causes controller 107 to generate the PWM pulse (shown in FIG. 3B) starting near the first time t1. The duration of the PWM pulse is related to the analog voltage at the VFB input to controller 107, as discussed above.

Figure 3D:
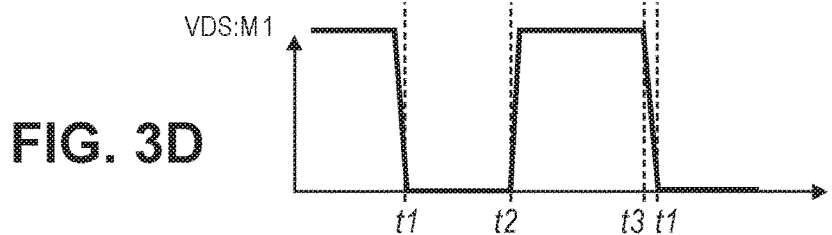

In response to receiving the PWM pulse from controller 107, driver 108 causes VG:M1 (shown in FIG. 3C) to go high at approximately the first time t1. The VG:M1 going high causes the main switch 105 to become conductive and allow current to flow from its drain (Dm1) to its source (Sm1). As a result of main switch 105 becoming conductive, the voltage at switch node Vsw 120 is clamped to 0 volts, as shown in FIG. 3D, and current flows through inductor 125 in direction I1 illustrated in FIG. 1.

Figure 3E:
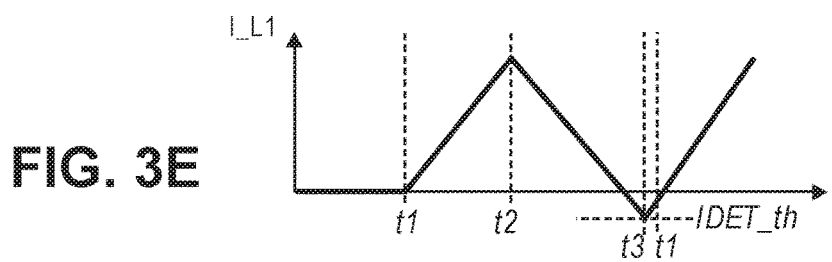
Figure 3F:
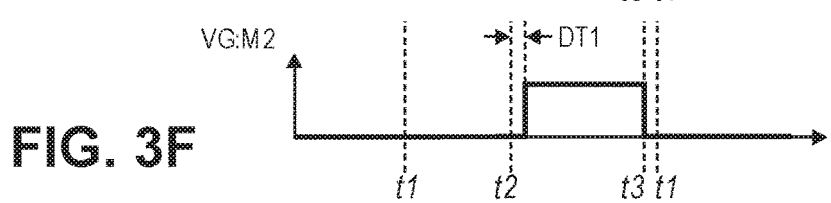
Figure 3G:
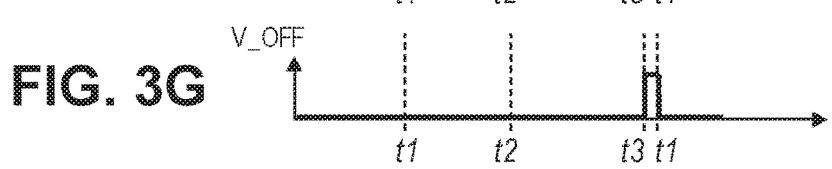
Figure 3H:
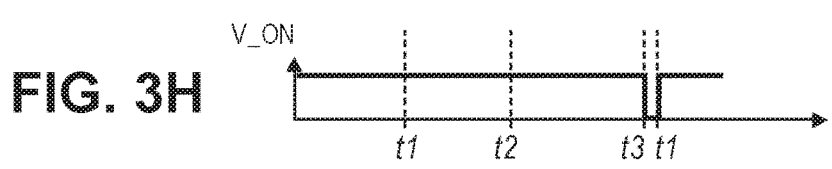

In FIG. 3E the current of main switch 105 is shown to linearly increase with respect to time up to a maximum current. For example, the maximum current may be approximately 2.5 Amps. The rate of increase of current through main switch 105 may be dictated by the parameters of inductor 125 as current increases within its windings. During this time, inductor 125 stores energy in the form of a magnetic field. The current in inductor 125 increases until main switch 105 is turned off, discussed below.

In response to the falling edge of V_PWM (shown in FIG. 3B) at time t2, driver 108 causes VG:M1 (shown in FIG. 3C) to fall at approximately time t2. As a result, the main switch 105 turns off, the current of main switch 105 rapidly transitions to 0 Amps, and VDS:M1 (shown in FIG. 3D) goes to the output voltage (e.g. approximately 400 volts). The VDS:M1 is clamped at the output voltage by diode 109 as a result of diode 109 conducting current toward RLOAD.

In response to the falling edge of V_PWM at time t2, driver 108 also causes VG:M2 (shown in FIG. 3F) to rise at time t2 plus delay time DT1. Delay time DT1 may be a fixed time, resulting from a propagation delay between the falling edge of V_PWM and the rising edge of VG:M2. In some embodiments, the propagation delay may be at least partly a result of a plurality of inverters or other logic circuits. In some embodiments, the propagation delay may be at least partly a result of a series resistor followed by a capacitor to ground forming an RC delay circuit. In some embodiments, the delay time DT1 may be caused by a voltage detection circuit monitoring the voltage of VDS:M1 (shown in FIG. 3D). In such embodiments, VG:M2 (shown in FIG. 3F) may be caused to rise at time t2 plus delay time DT1 in response to a signal from the voltage detection circuit indicating that the voltage of VDS:M1 has increased beyond a threshold. The voltage detection circuit may, for example, be similar or identical to I_Detect circuit 280.

In response to the rise of VG:M2, the second switch 106 turns on. The stored energy in the magnetic field of the inductor discharges and maintains the flow of current in direction I1. The current may flow through both the second switch 106 and through diode 109. This current flows into and charges capacitor CBUS 118. Because the energy flows into capacitor CBUS 118, it is conserved, improving the efficiency of circuit 100.

As shown in FIG. 3E, the current discharges to 0 amps when inductor 125 has exhausted the energy stored within its inductance. The current then goes negative and flows from capacitor CBUS 118, back through the inductor 125, and to capacitor CIN 117. At time t3, the current reaches a predetermined negative threshold IDET_th.

As a result of the current going negative, the voltage at the negative input to comparator 285 goes negative with respect to the source voltage of high side power switch 270. The voltage at the positive input to comparator 285 is connected to a reference voltage IDETthV, which is referenced to the source voltage of high side power switch 270. Once the voltage at the negative input to comparator 285 goes lower than the reference voltage IDETthV, I_Detect circuit 280 generates and transmits an OFF signal in V_OFF (shown in FIG. 3G) for high side logic 250 of driver 108.

In response to the OFF signal, high side logic 250 causes VG:M2 (shown in FIG. 3F) to go low and second switch 106 is turned off. In alternative embodiments, VG:M2 may be caused to go low as a result of a signal from a different current monitor circuit indicating that the current of inductor 125 has reached the negative threshold IDET_th. In some embodiments, VG:M2 may be caused to go low as a result of VG:M2 having a fixed duration high time. The fixed duration may result VG:M2 being generated by a fixed duration pulse generator, for example, configured to generate pulses of the fixed duration in response to the falling edge of V_PWM. In some embodiments, the duration of the fixed duration pulse may be at least partly a result of a plurality of inverters or other logic circuits. In some embodiments, the duration of the fixed duration pulse may be may be at least partly a result of a series resistor followed by a capacitor to ground forming an RC delay circuit.

After second switch 106 is turned off, the negative current of inductor 125 flows from the output capacitance of main switch 105 and through inductor 125 to capacitor CIN 117. As a result, VDS:M1 (shown in FIG. 3D) discharges to 0 V, and the output capacitance Coss of the main switch 105 is discharged, enabling ZVS.

In response to VDS:M1 discharging to 0 V, VDS_Detect circuit 290 generates and transmits an ON signal with V_ON (shown in FIG. 3H) to low side logic 210. In response to the received ON signal, low side logic 210, which is connected to a power supply which is negative with respect to $P_{GND}$, causes V_RST (shown in FIG. 3A) to fall at second time t1. In response to the falling edge of V_RST, controller 107 generates a second PWM pulse, which causes driver 108 to turn on main switch 105 while VDS:M1 is substantially 0 V, such that ZVS is achieved.

In some embodiments, it may be beneficial to turn on second switch 106 substantially only during the time when the inductor current is negative. This may, for example, be accomplished by generating the rising edge of VG:M2 in response to a signal from a current monitor circuit indicating that the inductor current is 0 or less than 0. This will allow for a smaller second switch 106 with a higher RDS(on) to be used since it will only conduct current for a small portion of time to achieve ZVS.

In some embodiments it may be beneficial for the switches to be able to withstand high voltage potentials and/or to switch at high frequencies, particularly when the transmitter runs off AC mains. In one embodiment the voltage potential across the switches may be in the range of 50-1000 volts DC and in another embodiment in the range of 100-600 volts DC. In one embodiment the voltage potential may be in the range of 100-250 volts DC and in another embodiment it may be in the range of 250-600 volts DC. In other embodiments the switching frequency may be in the range of 30 kHz-30 MHz while further embodiments it may operate in a range between 50 kHz-1 MHz. In another embodiment the switching frequency may be in the range of 100 kHz-500 kHz. In one embodiment the switching frequency may be 100 kHz.

In some embodiments, one or more of switches 105 and 106 may be a FET. In one embodiment one or more of switches 105 and 106 may be a GaN bidirectional FET. In another embodiment one or more of switches 105 and 106 may be a JFET, while in other embodiments it may be a different type of FET or any other type of solid-state switch. GaN-based bidirectional switches may be particularly useful in embodiments that may be used to efficiently switch high voltage buses (e.g., 400 volts) at high frequencies (e.g., 0.1-30 MHz) as described in more detail below. In some embodiments the efficiency of the power conversion circuit may be in the range of 60% to 95%. In one embodiment the efficiency of the power conversion circuit may be approximately 85%.

In some embodiments the power converter may be a single switch Boost converter may operate in critical conduction mode (CrCM) or discontinuous conduction mode (DCM). In further embodiments the circuit may operate in CrCM or DCM depending on the voltage amplitude at the input line and amount of load at the output.

Figure 4:
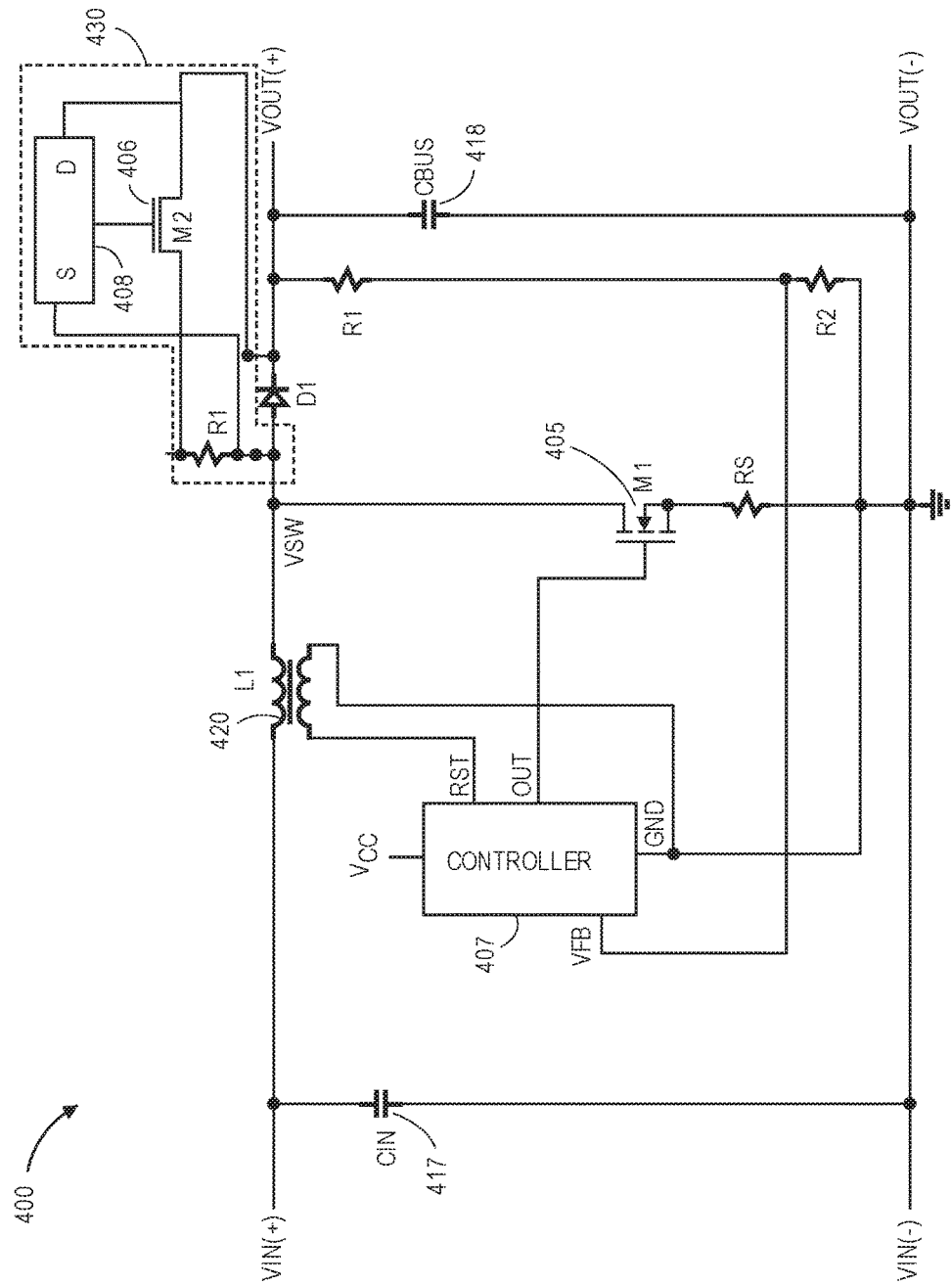
FIG. 4 is a circuit schematic illustration of a Boost converter using two switches according to another embodiment of the invention.

FIG. 4 is a circuit schematic illustration of a Boost converter circuit 400 using two switches according to another embodiment of the invention. In some embodiments, a main switch (M1) 405 and a second switch (M2) 406 may be used as bidirectional switches in the circuit. In further embodiments, a control scheme may be used by circuit controller 407 to control main switch 405 to cause zero voltage soft-switching (ZVS) of main switch 105, as discussed in more detail below.

Continuing to refer to circuit 400 in FIG. 4, controller 407 may, for example, be a standard boost controller circuit. For example, controller 407 may be configured to generate a pulse at its OUT output in response to either of: a) the controller 407 receiving power and turning on, and b) the controller 407 receiving an input signal at its RST input from the secondary winding of transformer 420. The duration of the pulse is determined at least in part by an analog voltage at the VFB input to controller 407.

As indicated in FIG. 4, controller 407 sends one or more gate drive signals to main switch 405. In response to the one or more gate drive signals, main switch 405 transitions between on and off states. In addition, second switch 406 transitions between on and off states in response to the voltages at the source and drain of second switch 406 generated by switch controller 408 and in response to the voltage at the drain of main switch 405.

Circuit 400 may receive power from a power source connected across VIN(+) and VIN(−). The power may, for example, be from a rectified AC mains power source voltage. In some embodiments main switch 405 and second switch 406 may be bidirectional N-channel gallium-nitride (GaN) high-electron mobility transistors (HEMT), however in other embodiments other switches may be used, as discussed in more detail below.

Figure 5:
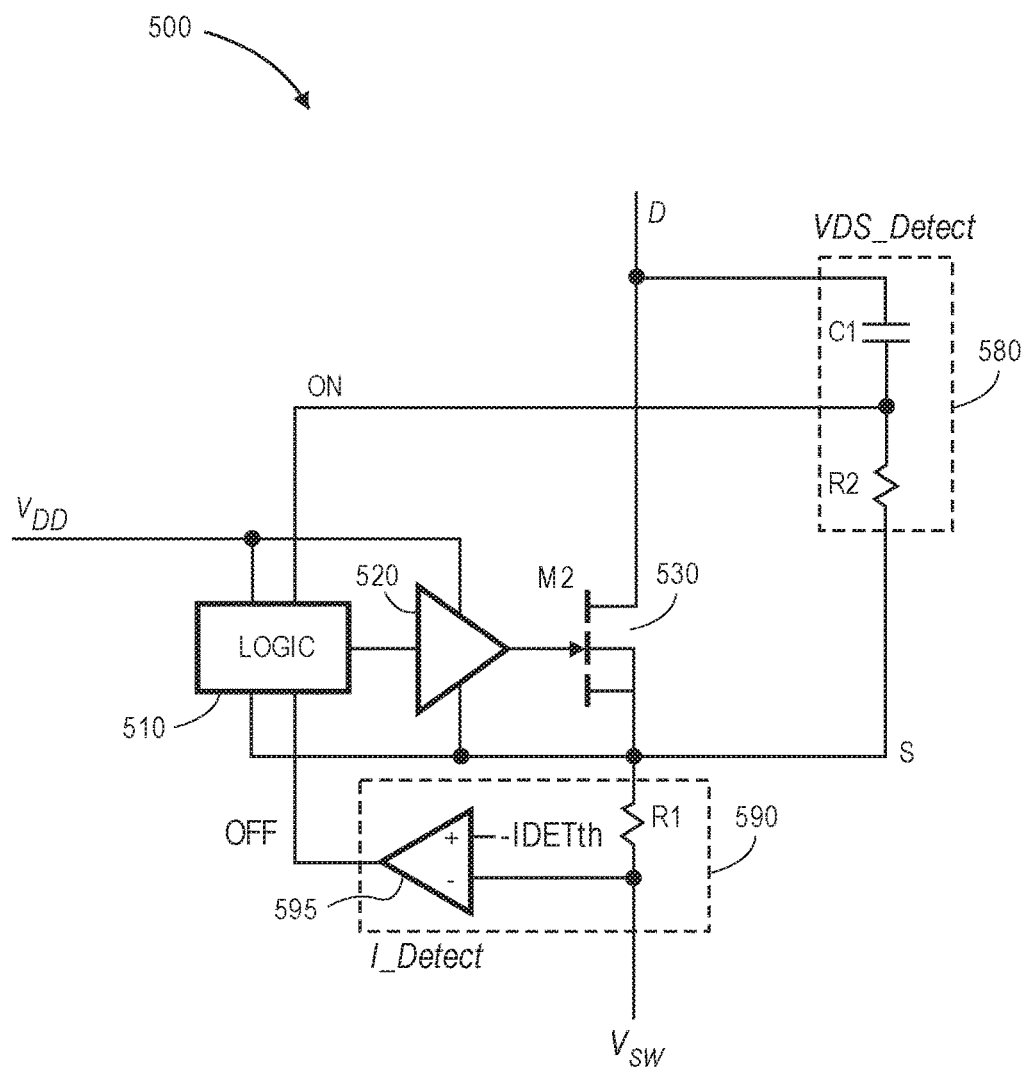
FIG. 5 is a circuit schematic illustration of an embodiment of a switch circuit which may be used in the circuit illustrated in FIG. 4.

FIG. 5 is a circuit schematic illustration of an embodiment of a switch driver circuit 500 which may be used as switch driver circuit 430 in converter circuit 400 illustrated in FIG. 4. Switch driver circuit 500 includes logic 510, second switch driver 520, second switch 530, second switch Vds detector 580, and second switch current detector 290.

Logic 510 respectively receives ON and OFF signals from second switch current detector 590 and second switch Vds detector 580. In response to the PWM signals, logic 510 generates and transmits a control signal to driver 520. In response to the control signal from logic 510, driver 520 generates and transmits a gate signal to second switch 530. Second switch 530 turns on or becomes conductive or turns off or becomes nonconductive according to and in response to the gate signal received from driver 520.

Second switch Vds detector 580 generates an ON signal in response to the voltage difference between the drain and source of second switch 530 increasing from 0 volts. The positive transition of the Vds of second switch 530 is capacitively coupled to the ON signal, causing the ON signal to go higher than a logic threshold. The ON signal is transmitted to logic 510. In response to the ON signal going higher than the logic threshold, logic 510 generates a control signal for driver 520. In response to the control signal, driver 520 generates a gate signal for second switch 530 which causes second switch 530 to turn on or become conductive.

Logic 510 and driver 520 have power supply reference connections to the source of second switch 530 and power supply $V_{DD}$. Power supply $V_{DD}$ may be a floating power supply, which is referenced to the voltage of the switch node Vsw. Power supply $V_{DD}$ may be generated, for example, with a bootstrap circuit. Power supply $V_{DD}$ may be generated, for example, with another circuit configured to generate a floating power supply referenced to a changing voltage.

Second switch current detector 590 generates an OFF signal in response to the current conducted to the switch node Vsw being greater than a threshold. The OFF signal is transmitted to logic 510. In response to the OFF signal, logic 510 generates and transmits a second control signal to driver 520. In response to the second control signal from logic 520, driver 520 generates and transmits a second gate signal to second switch 530. Second switch 530 turns off or becomes substantially non-conductive in response to the second gate signal received from driver 520, such that current substantially cannot flow between the drain and source of second switch 530.

Accordingly, as described, the second switch 530 406 is autonomously controlled. The second switch 530 406 does not receive signals from any controller other than switch controller 408. Instead, second switch 530 406 is turned on and turned off in response to its Vds voltage and its Ids current, as described above.

FIGS. 6A-6G illustrate a series of timing diagrams of certain currents and voltages of the circuit 400 of FIG. 4 during operation. In this embodiment, circuit 400 has the switch driver circuit 500 as the switch driver circuit 430.

FIGS. 6A-6G illustrate V_RST, VG:M1, VDS:M1, I_L1, VG:M2, V_OFF, and V_ON. V_RST is the voltage of a reset pulse signal generated by the secondary winding of transformer 420 which causes controller 407 to generate VG:M1. VG:M1 is the voltage of a pulse generated by controller 407, and is the gate voltage of main switch 405. VDS:M1 is the difference between the drain and source voltages of main switch 405. I_L1 is the current flowing through primary inductor L1 toward RLOAD. VG:M2 is the gate voltage of the second switch 406. V_OFF is the voltage of the OFF signal generated by second switch current detector 590. V_ON is the voltage of the ON signal generated by second switch Vds detector 580.

Controller 407 receives a reset pulse in V_RST (shown in FIG. 6A) from the secondary winding of transformer 420.

Controller 407 generates a gate pulse in VG:M1 (shown in FIG. 6B) in response to receiving the reset pulse at its RST input. The duration of the gate pulse is determined at least in part by an analog voltage at the VFB input to controller 407. For example, a gate pulse of a longer duration may cause the converter to generate a higher voltage output across RLOAD, and therefore, at the VFB input to controller 407. Similarly, a gate pulse of a shorter duration may cause the converter to generate a lower voltage output across VOUT(+) and VOUT(−), and therefore, at the VFB input to control 407.

In addition, a lower voltage at the VFB input to controller 407 may cause a gate pulse of a longer duration. Similarly, a higher voltage at the VFB input to controller 407 may cause a gate pulse of a shorter duration.

Accordingly, the analog voltage at the VFB input to controller 470 may be used as a feedback signal so that the circuit 400 generates the desired output voltage. In such an arrangement, if the analog voltage at the VFB input to controller 470 is greater than a threshold, controller 407 is configured to generate gate pulses of a shorter duration and if the analog voltage at the VFB input to controller 470 is less than the threshold, controller 470 is configured to generate PWM pulses of a greater duration. In the embodiment of FIG. 4, the analog voltage at the VFB input to controller 470 is generated by a resistor divider formed by R1 and R2, where the analog voltage at the VFB input to controller 470 is equal to R2/(R1+R2) times the voltage across R1 and R2.

Figure 6A:
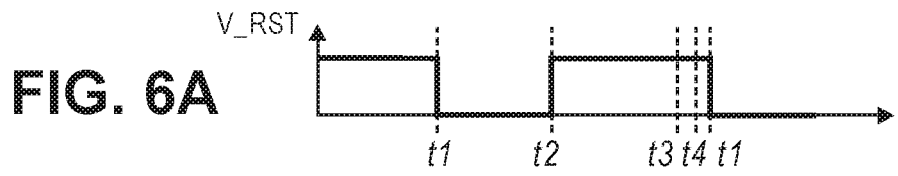
FIG. 6A to 6G is a series of timing diagram illustrations of various electrical parameters of the circuit of plot of FIG. 4.
Figure 6B:
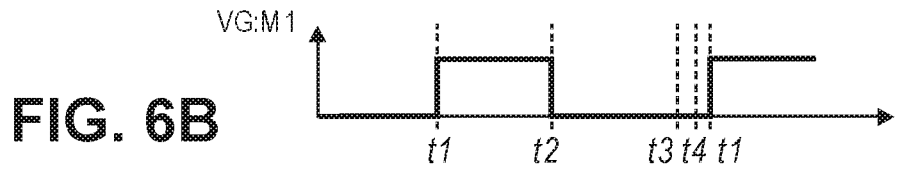

Referring to FIGS. 6A and 6B, the falling edge of V_RST (shown in FIG. 6A) at the first time t1 causes controller 407 to generate the gate pulse in VG:M1 (shown in FIG. 6B) starting near the first time t1. The duration of the gate pulse is related to the analog voltage at the VFB input to controller 407, as discussed above.

Figure 6C:
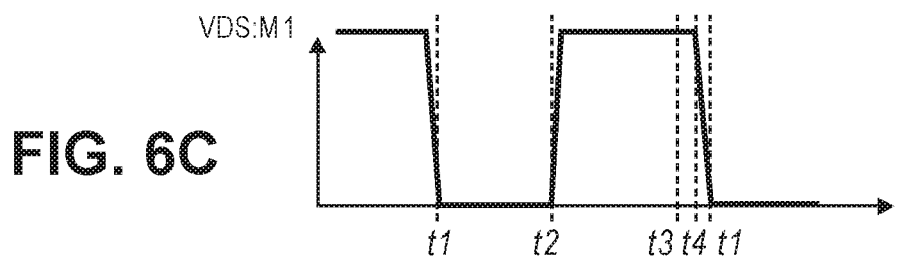

In response to receiving the gate pulse from controller 407, the main switch 405 becomes conductive and allows current to flow from its drain to its source. As a result of main switch 405 becoming conductive, the voltage at switch node VSW is clamped to 0 volts, as shown in FIG. 6C, and current flows through inductor 420 toward diode D1.

Figure 6D:
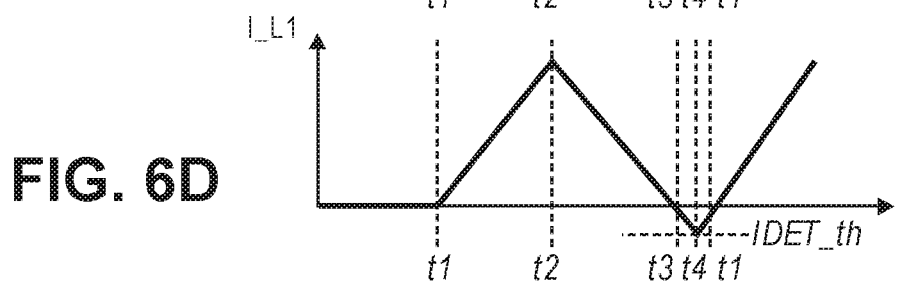
Figure 6E:
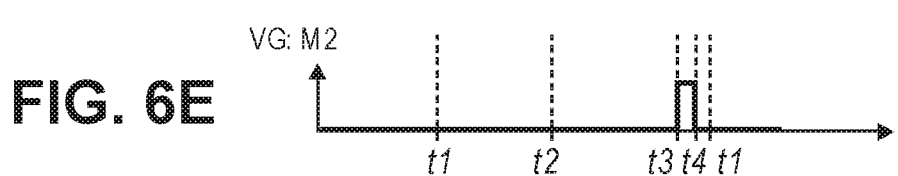
Figure 6F:
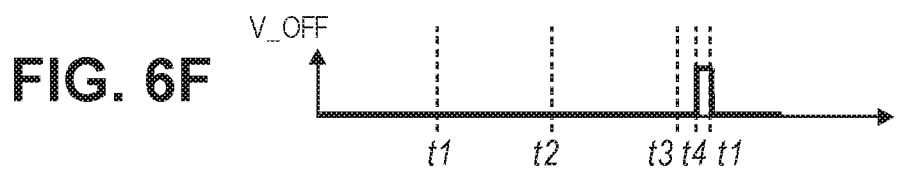
Figure 6G:
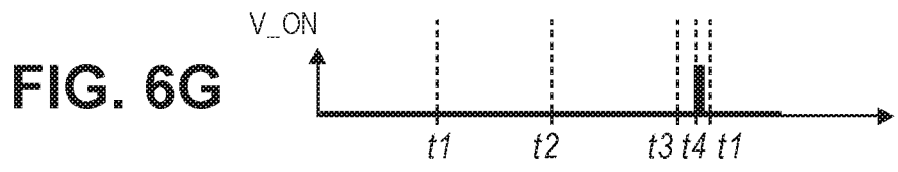

As shown in FIG. 6D, the current of inductor L1 (and of main switch 405) is shown to linearly increase with respect to time up to a maximum current. For example, the maximum current may be approximately 2.5 Amps. The rate of increase of current through main switch 405 may be dictated by the parameters of inductor L1 as current increases within its windings. During this time, inductor L1 stores energy in the form of a magnetic field. The current in inductor L2 increases until main switch 405 is turned off, discussed below.

In response to the falling edge of the gate pulse in VG:M1 (shown in FIG. 6B) at time t2, the main switch 405 turns off, the current of main switch 405 rapidly transitions to 0 Amps, and VDS:M1 (shown in FIG. 6C) goes to the output voltage (e.g. approximately 400 volts). The VDS:M1 is clamped at the output voltage by diode D1 as a result of diode D1 conducting current toward the output across VOUT(+) and VOUT(−).

In response to the main switch 405 turning off, the stored energy in the magnetic field of the inductor discharges and maintains the flow of current toward diode D1. This current flows into and charges capacitor CBUS 428. Because the energy flows into capacitor CBUS 418, it is conserved, improving the efficiency of circuit 400.

As shown in FIG. 6D, the current discharges to 0 amps when inductor L1 has exhausted the energy stored within its inductance. The current of inductor L1 then goes negative and flows through the inductor L1, and to capacitor CIN 417.

At time t3, the current negative current causes an increase in the difference between the drain and source voltages of the second switch. This results in the second switch Vds detector 580 generating an ON signal, which causes logic 510 to generate a control signal for driver 520 turning on second switch 530, as discussed above. The second switch 530 turning on allows for current to flow from the capacitor CBUS 418 through inductor L1.

As a result of the current going negative, the voltage at the negative input to comparator 595 goes negative with respect to the source voltage of second switch 530. The voltage at the positive input to comparator 595 is connected to a reference voltage IDETthV, which is referenced to the source voltage of second switch 530. Once the voltage at the negative input to comparator 595 goes lower than the reference voltage IDETthV, second switch current detector 590 generates and transmits the OFF signal in V_OFF (shown in FIG. 6F) for logic 510.

In response to the OFF signal, logic 510 causes VG:M2 (shown in FIG. 6E) to go low and second switch 530 is turned off. In alternative embodiments, VG:M2 may be caused to go low as a result of a signal from a different current monitor circuit indicating that the current of inductor L1 has reached the negative threshold IDET_th. In some embodiments, VG:M2 may be caused to go low as a result of VG:M2 having a fixed duration high time. The fixed duration may result VG:M2 being generated by a fixed duration pulse generator, for example, configured to generate pulses of the fixed duration in response to an increase in the difference between the drain and source voltages of the second switch. In some embodiments, the duration of the fixed duration pulse may be at least partly a result of a plurality of inverters or other logic circuits. In some embodiments, the duration of the fixed duration pulse may be may be at least partly a result of a series resistor followed by a capacitor to ground forming an RC delay circuit.

After second switch 530 is turned off, the negative current of inductor L1 flows from the output capacitance of main switch 405 and through inductor L1 to capacitor CIN 417. As a result, VDS:M1 (shown in FIG. 6C) discharges to 0 V, and the output capacitance Coss of the main switch 405 is discharged, enabling ZVS.

In response to VDS:M1 discharging to 0 V, the secondary winding of inductor 420 causes V_RST (shown in FIG. 6A) to fall at second time t1. In response to the falling edge of V_RST, controller 407 generates a second gate pulse (shown in FIG. 6B), turns on main switch 405 while VDS:M1 is substantially 0 V, such that ZVS is achieved.

In some embodiments, as discussed, a control scheme drives bidirectional switch converters, such as a two-switch Boost, using ZVS is disclosed. The control scheme may achieve ZVS, while maintaining compatibility with start-up, steady-state, pulse skipping, bursting or pulse frequency modulation (PFM) controller modes.

In some embodiments, a power conversion circuit comprises a first solid-state bidirectional switch connected between a first terminal of a voltage source and a switch node. A second solid-state bidirectional switch is connected between the switch node and a second terminal of the voltage source. The first switch is configured to turn on before the second switch.

In some embodiments, the power conversion circuit is configured to operate in a critical conduction mode. In further embodiments the first and second solid-state bidirectional switches are GaN-based devices that operate between 50 kHz and 100 MHz.

In further embodiments the power conversion circuit is configured to operate at voltages between 100 V and 600 V. In one embodiment, the first and second solid-state bidirectional switches may be co-packaged while in other embodiments a switch driver may be co-packaged with the first and second solid-state bidirectional switches. In yet further embodiments the first and second solid-state bidirectional switches may be monolithically integrated on a first die comprising GaN. In other embodiments the first switch driver circuit and the first solid-state bidirectional switch are monolithically integrated on a first die and a second switch driver circuit and the second solid-state bidirectional switch are monolithically integrated on a second die.

The embodiments shown herein include various components. For example, the embodiments collectively include a main switch, a main switch driver, a controller configured to provide signals which determine the state of the main switch, a second switch, a second switch driver, circuitry configured to provide signals which determine the state of the second switch, and a level shifter.

The various components of some embodiments are integrated on a single die, which is packaged.

For example, in some embodiments, the main switch and the main switch driver are integrated on a first die, the second switch and the second switch driver are integrated on a second die, and the first and second die are co-packaged. In some embodiments, the circuitry configured to provide signals which determine the state of the second switch are additionally integrated on the second die. In some embodiments, the level shifter is additionally integrated on either the first die or the second die. In some embodiments, the controller is on a third die co-packaged with the first and second die. In some embodiments, the level shifter is on a fourth die co-packaged with the first, second, and third die.

The various components of some embodiments are integrated on multiple die, which are packaged in multiple packages. For example, in some embodiments, the main switch and the main switch driver are integrated on a first die, the second switch and the second switch driver are integrated on a second die, and the first and second die are separately packaged. In some embodiments, the circuitry configured to provide signals which determine the state of the second switch are additionally integrated on the second die. In some embodiments, the level shifter is additionally integrated on either the first die or the second die. In some embodiments, the controller is on a third die separately packaged from the packages of the first and second die. In some embodiments, the level shifter is on a fourth die separately packaged from the first, second, and third die. In some embodiments, the circuitry configured to provide signals which determine the state of the second switch, and a level shifter.

In one embodiment the power conversion circuit may be disposed within a unitary electronic component. In some embodiments the component may be manufactured from an overmolded printed circuit board, while in other embodiments the component may comprise an overmolded lead frame. In further embodiments the component may comprise a driver circuit configured to turn on and off the first and second solid-state bidirectional switches. The switches may be disposed on a monolithic semiconductor substrate comprising GaN.

In one embodiment, a power conversion circuit may include a first solid-state bidirectional switch having a first switch output capacitance and connected between a first terminal of a voltage source and a switch node. A second solid-state bidirectional switch is connected between the switch node and a second terminal of the voltage source. The second switch is configured to turn on before the first switch and to generate a sufficient amount of negative current flowing in the inductor. After the second switch is turned off, the negative current will allow the first switch's output capacitance to discharge to approximately 0 volts before the first switch is turned on. In further embodiments a diode is connected in parallel to the second switch to allow for current to flow through the diode instead of the switch to minimize switch conduction losses and to protect the switch against excessive inrush or surge currents.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A power converter circuit, comprising:
   a capacitor connected across first and second output terminals;
   an inductor, configured to receive current from a power source;
   a main switch, configured to selectively conduct current from the inductor to a ground;
   a diode, configured to conduct current from the inductor to the capacitor; and
   a second switch connected in parallel with the diode, wherein the second switch is configured to selectively conduct current from the capacitor to the inductor.

2. The circuit of claim 1, wherein the main switch is configured to become conductive while the voltage across the main switch is substantially 0 V.

3. The circuit of claim 1, further comprising a controller configured to generate signals controlling the conductive states of the main switch and the second switch.

4. The circuit of claim 1, wherein the diode is configured to conduct the current from the inductor to the capacitor while the main switch is non-conductive.

5. The circuit of claim 1, wherein the second switch is configured to conduct the current from the inductor to the capacitor while the main switch is non-conductive.

6. The circuit of claim 1, wherein the second switch is configured to conduct current from the capacitor to the inductor while the main switch is non-conductive.

7. The circuit of claim 1, wherein the inductor is configured to conduct current from the main switch and from the second switch while the main switch and the second switch are non-conductive, such that the voltage across the main switch becomes substantially 0 V.

8. The circuit of claim 7, wherein the main switch is configured to become conductive as a result of the voltage across the main switch becoming substantially 0 V.

9. The circuit of claim 1, wherein the main switch is configured to be conductive for a duration based on an output voltage of the circuit.

10. The circuit of claim 1, wherein the second switch is configured to become non-conductive in response to current flowing from the capacitor to the inductor having a minimum magnitude.

11. The circuit of claim 1, wherein the second switch is configured to become conductive in response to a decrease in the difference between the voltages at the drain and source of the second switch.

12. A method of operating a power converter circuit comprising a capacitor connected across first and second output terminals, an inductor configured to receive current from a power source, a main switch, a diode, and a second switch connected in parallel with the diode, the method comprising:
   conducting current from a power source to the inductor;
   selectively conducting current from the inductor to a ground;
   with the diode, conducting current from the inductor to the capacitor; and
   with the second switch, selectively conducting current from the capacitor to the inductor.

13. The method of claim 12, further comprising causing the main switch to become conductive while the voltage across the main switch is substantially 0 V.

14. The method of claim 12, wherein the diode conducts the current from the inductor to the capacitor while the main switch is non-conductive.

15. The method of claim 12, wherein the second switch conducts the current from the inductor to the capacitor while the main switch is non-conductive.

16. The method of claim 12, wherein the second switch conducts current from the capacitor to the inductor while the main switch is non-conductive.

17. The method of claim 12, wherein the inductor conducts current from the main switch and from the second switch while the main switch and the second switch are non-conductive, such that the voltage across the main switch becomes substantially 0 V, and wherein the main switch becomes conductive as a result of the voltage across the main switch becoming substantially 0 V.

18. The method of claim 12, wherein the main switch is conductive for a duration based on an output voltage of the circuit.

19. The method of claim 12, further comprising causing the second switch to become non-conductive in response to current flowing from the capacitor to the inductor having a minimum magnitude.

20. The method of claim 12, further comprising causing the second switch to become conductive in response to a decrease in the difference between the voltages at the drain and source of the second switch.

* * * * *